United States Patent [19]
Lepley

[11] 3,710,986
[45] Jan. 16, 1973

[54] SAFETY ENCLOSURE FOR SILOS

[76] Inventor: James W. Lepley, R. D. No. 1, Smithville, Ohio 44677

[22] Filed: Feb. 23, 1971

[21] Appl. No.: 117,955

[52] U.S. Cl.................222/185, 49/33, 214/17 DA
[51] Int. Cl. ................................................B67d 5/06
[58] Field of Search........222/193, 185, 63, 173, 180, 222/181; 49/33, 381; 214/17 DA, 17 R, 16 R, 1 CM

[56] References Cited

UNITED STATES PATENTS

| | | | |
|---|---|---|---|
| 3,424,350 | 1/1969 | Herr et al. | 222/63 |
| 3,090,507 | 5/1963 | Gutekunst et al. | 214/17 D |

FOREIGN PATENTS OR APPLICATIONS

| | | | |
|---|---|---|---|
| 65,543 | 11/1969 | Germany | 214/17 R |

Primary Examiner—Robert B. Reeves
Assistant Examiner—James M. Slattery
Attorney—C. Hercus Just

[57] ABSTRACT

This invention relates to a safety enclosure for a silo of the bottom-unloading type in which an access port or manhole is in the bottom floor to permit access to certain parts of the unloading mechanism within the lower part of the silo so as to protect a mechanic against danger resulting from accidental collapsing of silage above the mechanism which could otherwise inundate the mechanic. The enclosure is of the type which has certain parts movable, preferably by power means, between a retracted inoperative position and an extended operative position to dispose an access door substantially vertically when the parts are in the extended operative position so that it may be opened adjacent the unloading mechanism for ready access thereto.

11 Claims, 6 Drawing Figures

INVENTOR.
JAMES W. LEPLEY

INVENTOR.
JAMES W. LEPLEY

BY

ATTORNEY

SAFETY ENCLOSURE FOR SILOS

BACKGROUND OF THE INVENTION

The unloading of silos has presented certain difficulties for many years, regardless of the type of means or mechanism employed to accomplish the unloading. To facilitate such unloading, a number of mechanisms disposed in the lower portion of the silo have been developed in relatively recent years to provide what is known as a bottom-unloading silo. Typical examples of such silos and bottom-unloading mechanism therefor are illustrated in U.S. Pat. Nos. 3,424,350 and 3,567,078. It will be seen from said patents that an auger with which certain chain mechanisms are associated is rotated in a direction to gradually dislodge silage from the lower portion of the mass thereof in the silo, following which the dislodged silage passes through a discharge opening in the bottom of the silo.

The intended operation of such bottom unloading mechanism is that after rotation of the auger and chain mechanism is initiated for a limited period, a cavity is gradually formed in the mass of silage adjacent the auger and chains, whereupon continued rotation of the auger causes the chain gradually to be extended radially outward by centrifugal force. This results in a cavity of substantial volume being developed until the weight of the mass of silage above the cavity gradually succumbs to the force of gravity and falls onto the discharging mechanism. Further rotation of the mechanism again produces a cavity in the mass and the foregoing cycle is continually repeated as long as necessary until a desired amount of silage has been discharged from the silo.

The dislodging mechanism requires attention from time to time. For example, as the chains wear, they must be replaced. To accomplish this, an access port or manhole usually is provided in the floor or bottom wall of the silo. Such port normally is covered by a suitable closure. When the closure is removed, a certain amount of silage usually falls through the access port and a mechanic has to dig his way through a portion of the compacted residual silage on the floor of the silo or, as sometimes happens, a substantial amount of the silage must be dug away and otherwise removed until he mechanic gains access to the auger and chains.

Experience has also found that while a mechanic is working upon the auger and/or chains, and especially when a cavity has previously been formed in the lower portion of the silage by operation of the auger and chains, gravity sometimes causes the bridged mass of silage above the mechanic to fall upon him, sometimes trapping him and either injuring him and/or smoothering him before he can escape.

Under the foregoing circumstances, it is the principal object of the present invention to provide a safety enclosure which obviates the risks and dangers described above incident to a mechanic repairing or replacing the aforementioned dislodging mechanism, such as by replacing the chains or otherwise, and thereby rendering such operation capable of being performed under safe conditions.

SUMMARY OF THE INVENTION

The safety enclosure for silos comprising the present invention primarily consists of a shell-like structure which comprises preferably a stationary part connectable to the bottom wall or floor of a silo around the access port therein, and a movable part which is associated with the stationary part for movement between a retracted, inoperative position and an extended operative position. Thereby, when the movable part of the enclosure is in the extended, operative position, a door therein is disposed adjacent the dislodging mechanism and especially the chains and auger thereof so that operations such as repair or replacement thereof may be undertaken while the mechanic is either within or immediately adjacent the enclosure under conditions where, in the event collapsing of overhead silage occurs, rapid retreat into the enclosure may take place, and thus, minimize or prevent injury to the mechanic.

Another object of the invention is to form said relatively stationary and movable parts of the enclosure so as to be of a segmental nature, whereby when the parts are in retracted, in operative position, the enclosure does not interfere with the normal operation of the material-dislodging auger and chain, but when the movable part of the enclosure is disposed in its extended, operative position, the access door thereof is disposed substantially vertically so as to be immediately adjacent the auger and chains connected thereto which are stationary under such circumstances and depend vertically along the auger.

A still further object of the invention is to provide an arcuate upper wall which extends between the upper edges of the segmental sides of the movable part of the enclosure, whereby when said movable part is in its extended, operative position, the segmental wall is disposed overhead between the side walls of the enclosure and thus, prevents ingress of the material into the enclosure when disposed in its extended, operative position.

Still another object of the invention is to provide power means which are connected to the movable part of the enclosure and thereby facilitate the disposition of the movable part of the enclosure in its extended, operative position without requiring any effort on the part of the mechanic to undertake such extension of the enclosure to said operative position thereof.

A still further object of the invention is to so construct the components of the enclosure that they are simple, capable of ready installation, and are durable for long periods of use, whereby the overall costs of providing such safe working conditions for a mechanic are minimal.

Details of the foregoing objects and of the invention, as well as other objects thereof, are set forth in the following specification and illustrated in the accompanying drawings comprising a part thereof.

DETAILED DESCRIPTION

Figure 1:
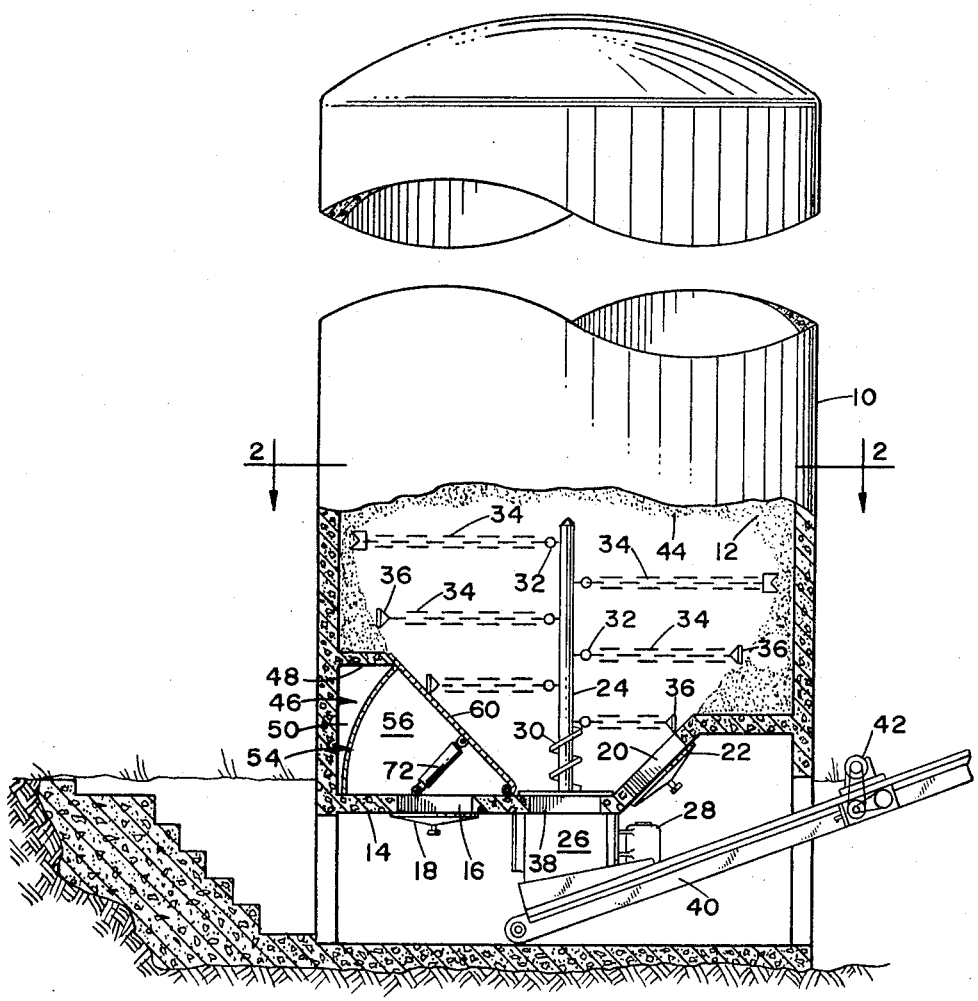
FIG. 1 is a vertically foreshortened and partially vertically section elevation of an exemplary silo having a safety enclosure embodying the principles of the present invention as seen substantially on the line 1—1 of FIG. 2.
Figure 2:
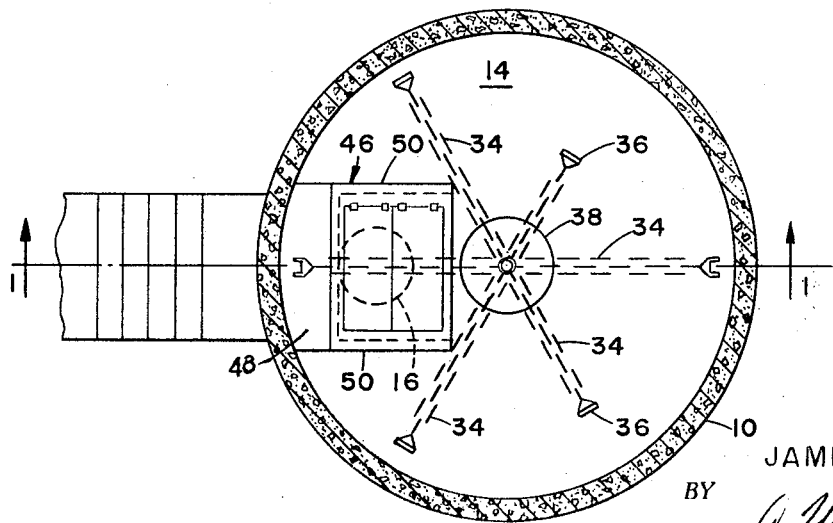
FIG. 2 is a horizontal sectional view of the silo and safety enclosure structure illustrated in FIG. 1 as seen on the line 2—2 of said figure.
Figures 3, 4, 5, 6:
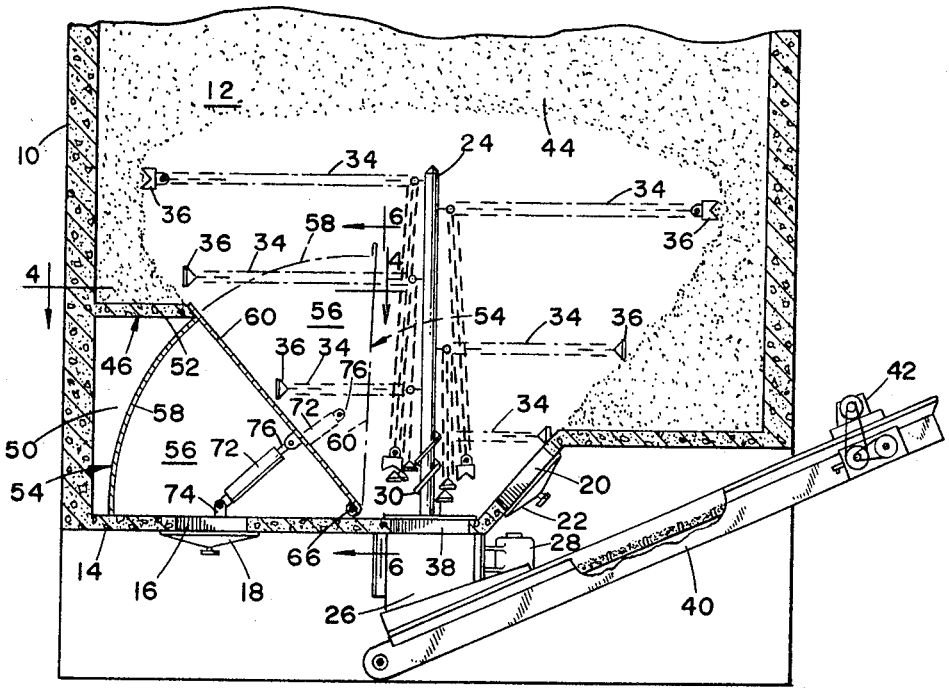
FIG. 3 is a fragmentary enlarged vertical sectional view of the lower portion of the silo illustrated in FIG. 1 and shown on a larger scale than is employed in FIG. 1.
FIG. 4 is a fragmentary vertical plan view of the stationary part of the safety enclosure shown in FIGS. 1 and 2, as seen on the line 4—4 of FIG. 3.
FIG. 5 is a perspective view of the movable part of the safety enclosure shown in FIGS. 2 and 3.
FIG. 6 is a fragmentary vertical sectional view taken along line 6—6 of FIG. 3 and showing, in fragmentary manner, part of the access door carried by the movable part of said safety enclosure.

Referring to FIG. 1, the silo 10 is intended to be exemplary of silos in general of the type used to store silage 12 which, in general, is of a comminuted nature. Silos of this type not uncommonly are of the order of 50 or 60 feet or more in height and the diameters may range, for example, between 10 and 15 feet or more. The silo illustrated especially in FIGS. 1–3 is shown as being of reinforced concrete construction but this only is intended to be exemplary rather than restrictive of a number of different types of silo constructions.

The silo 10 is provided with a bottom wall or floor 14 in which an access port or manhole 16 is provided. Normally, it is closed by an appropriate cover 18 which is connected by any suitable means to the bottom wall 14. If desired, an additional access port 20 and enclosure 22 therefor may be provided as shown in FIG. 1.

Unloading mechanism is also provided in the lower portion of the silo 10. Such mechanism comprises a rotary shaft 24 which extends upwardly from suitable supporting mechanism 26 which includes bearings that are not shown in detail. Said shaft is driven by an appropriate electric motor 28, for example. The shaft 24 also is provided with a spiral auger 30 which, for purposes of simplification, is shown only at the lower portion of shaft 24, but it is to be understood that in actual construction, the same preferably continues to the upper end thereof.

At vertically spaced locations, eyelets 32 are connected to the shaft for purposes of securing dislodging mechanism thereto in the form of various lengths of chains 34, which preferably have digging elements 36 on the outer ends thereof. The chains 34 gradually increase in length from those at the lower portion of the shaft 24 to those at the upper end thereof. In operation, especially when discharge of a certain amount of silage is desired, gravity normally results in the mass of silage 12 being somewhat compacted around the auger 30 and the chains 34 which, under such circumstances, extend downwardly around the auger.

When the motor 28 is energized, the auger 30, with the chains draped therealong, commences to revolve and gradually dislodges and feeds material through the discharge opening 38, from which it falls onto removal mechanism, such as the discharge conveyor 40 which is driven by any suitable power means such as the power unit 42 shown in FIG. 1. The conveyor 40 delivers the material into any suitable receptacle such as a feed cart by which the material is delivered to feeding bins or stalls for cattle and the like.

As the rotation of the auger 30 and chains 34 continues following the motor 28 being energized, a cavity is gradually developed in the mass of silage which surrounds the auger and chains. Progressively, the cavity is enlarged and, ultimately, such cavity assumes outlines generally shown in FIG. 1 as indicated at 44, wherein the compact silage is bridged over the removal mechanism. Such cavity is unstable, however, particularly if the mass of silage 12 disposed above the same is of substantial extent and corresponding weight. Gravity normally will cause the cavity to collapse, especially at the completion of a certain unloading operation, whereby when further unloading is desired, it normally is found that the overhead mass of silage has fallen around the auger and the draped chain, as described hereinabove.

Also as mentioned in the foregoing, it is necessary from time to time either to repair or replace the chains 34, the digging elements 36, or otherwise service the bottom-unloading mechanism of the type generally illustrated in FIGS. 1-3. Heretofore, under such circumstances, it has been necessary for a mechanic to remove, for example, the closures or covers 18 or 22, and dig his way into the silage until he reaches the auger or chain or any other part of the mechanism which requires attention. It may be that a cavity 44 of a certain size exists under such circumstances, but, especially if any jarring of the mechanism occurs during such repair or replacement operations, collapsing of the cavity can be and frequently is induced with a result that the mechanic is inundated in the falling silage and injury and/or suffocation can result.

In view of the foregoing, the principal object of the present invention is to provide a safety enclosure 46 which is of rugged and durable nature, yet relatively simple and correspondingly low in cost to fabricate and install, for purposes of providing a safe working compartment and/or retreat unit to which a mechanic may quickly retire under circumstances, for example, where collapsing of a cavity in the silage occurs while repair operations are under way.

The safety enclosure 46 preferably is of a permanent nature and, in accordance with the preferred construction of the invention, includes two parts. Part 48 is stationary and, as best shown in FIG. 4, comprises a pair of spaced, substantially vertical sidewalls 50. If desired, the stationary part 48 may be formed from poured concrete, metal, wood siding or otherwise. In addition to the sidewalls 50, said stationary part includes a topwall 52 of limited length which extends between the upper edges of the generally segmentally shaped sidewalls 50, which shape is best shown in FIGS. 1 and 3. The lower edges of the sidewalls 50 preferably are suitably anchored to the bottom wall 14 of the silo.

The safety enclosure 46 also includes a movable part 54 which, for convenience and economy, may be formed from sheet metal, for example. Said movable part comprises a pair of segmentally shaped sidewalls 56. Extending between the upper arcuate edges thereof is an arcuate upper or topwall 58, the opposite edges of which are securely fastened to the arcuate upper edges of the sidewalls 56. One edge of each of the sidewalls 56 also is securely connected, such as by welding or otherwise, to a cover panel 60.

The movable part 54 of the safety enclosure 46 preferably is connected to the stationary part 48 of said safety enclosure by pivotal means. However, any other appropriate, reasonably equivalent mechanism for providing relative movement between said parts of the safety enclosure is intended to be embraced within the purview of the present invention. For simplicity of construction, however, pivotal movement is practical and economical, whereby details of such type of movement are included in the drawings and the following description of the invention, primarily in an illustrative rather than a restrictive manner, however.

Referring to FIGS. 4 and 5, in particular, it will be seen that the apex portions of the generally segmental sidewalls 50 of the stationary part 48 of the safety enclosure are provided with pivot openings 62, and correspondingly, the apex portions of the segmental sidewalls 56 of the movable part 54 of safety enclosure 46 are provided with pivot openings 64. These pivot openings 62 and 64 may be in the form of appropriate bearings through which pivot pins or bolts 66, shown in exemplary manner in FIG. 3, extend.

The movable part 54 of the safety enclosure is movable between the retracted, inoperative position thereof, shown in full lines in FIG. 3, and the extended, operative position thereof, shown in phantom in FIG. 3. In said extended, phantom position shown in FIG. 3, it will be seen that the cover panel 60 is substantially vertical and immediately adjacent the auger 30 and the material agitating and removing means 34. For purposes of providing immediate access to these material-dislodging elements of the bottom-unloading mechanism of the silo, the cover panel 60 preferably is provided either with one or a plurality of access doors 68, as desired, which are best shown in detail in FIGS. 5 and 6. Said doors are connected by suitable hinges to the cover panel 60 adjacent one edge thereof. It will be understood that the cover panel 60 is provided with a suitable access opening 70 therein through which, when the access doors 68 have been moved, preferably inwardly, to open position, will permit access of a mechanic to the dislodging mechanism comprising auger 30 and chains 34, as well as other elements comprising part of the same.

To facilitate the movement of the movable part 54 of the safety enclosure 46 from the retracted, inoperative position thereof shown in full lines in FIG. 3, to the extended, operative position thereof, shown in phantom in FIG. 3, the present invention contemplates the use of power means in the form of pneumatic or hydraulic cylinder units 72. In the preferred construction, a pair of said cylinder units 72 are employed respectively adjacent the sidewalls 56 of the movable part 54 of the safety enclosure 46. It will be understood that each hydraulic cylinder unit 72 includes a piston and a projecting end of the piston rod thereof, for example, is connected, as shown in FIGS. 3 and 6, to a clevis 74, while the remote end of the cylinder 72 is connected by a pintle 76, for example, to the sidewall 56 of the movable part 54.

An appropriate supply of pneumatic or hydraulic fluid, not shown, is connected by suitable conduits to the cylinder units 72 which preferably are respectively adjacent opposite sides of the movable part 54 of the safety enclosure. Said cylinder units are actuatable simultaneously so as not to tend to skew the movable part 54 of the safety enclosure which, in vertical section, is substantially U-shaped. Although not specifically illustrated in the drawings, it is to be understood that if desired, a single piston and cylinder unit 72, for example, may be provided respectively between the topwall 52 of the safety enclosure 46 and the upper part of cover panel 60, preferably intermediately between the opposite side edges thereof, whereby only a single power unit of such type need be employed.

From the foregoing, it will be seen that the present invention provides a safety enclosure of two relatively movable parts; one preferably being stationary, and the other being movable relative thereto, the latter being of a segmental nature, whereby when in extended, operative position, the arcuate upper wall 58 thereof provides suitable enclosing means for a mechanic from which he may either operate or into which he may retreat during repair or replacment operations of the bottom-unloading mechanism of the silo, particularly when collapsing of the cavity 44 occurs.

At the commencement of such repair operations, even if the silage has descended so as to surround the safety enclosure 46, the power afforded by the cylinder unit 72 is sufficient that it will compress any of the silage material surrounding the movable part 54 of the safety enclosure incident to moving the movable part from the full line position thereof shown in FIG. 3 to the extended, operative, phantom position thereof shown in said Figure, following which the mechanic may open one or both of the doors 68, as required, to gain access to the bottom-unloading mechanism which is disposed immediately adjacent said doors. Under such circumstances, it is possible for the mechanic to operate in safety. Disposition of the safety enclosure in extended, operative position is undertaken without manual or physical effort on the part of the mechanic due primarily to the provision of power means for this purpose in the form of pneumatic or hydraulic cylinder units 72.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. For use with a silo having bottom unloading mechanism in a lower part of the silo and also having an access port in the bottom thereof adjacent said mechanism, an enclosure comprising in combination, an enclosing shell assembly having a member adapted to be affixed stationarily to the bottom of a silo of the aforesaid type and extending across said access port therein, and another member movable relative to said stationary member and having an outlet door therein operable to permit egress from said shell into the interior of the silo, said movable member being movable relative to said stationary member between retracted inoperative position and an operative extended position adjacent said unloading mechanism to permit servicing the same by an operator while protected by said enclosure.

2. The enclosure according to claim 1 in which said shell has means to pivotally support said outlet door, and means operable to move said movable member between said retracted inoperative and extended operative positions.

3. The enclosure according to claim 2 in which said means to move said movable member comprises power means connected to said movable member and being operable to move the same from one of said positions to the other.

4. The enclosure according to claim 1 in which said outlet door is adapted to be opened when said movable member is in said extended operative position.

5. The enclosure according to claim 4 in which said stationary and movable members have portions thereon adapted to cooperate with each other to provide enclosing side walls operable to prevent ingress of contents of the silo into said shell when said parts parts are disposed either in the operative or inoperative positions thereof and said outlet door is closed.

6. The enclosure according to claim 5 in which said door is connected to a wall of said movable member, said wall having an opening normally closed by said door and said wall being positioned substantially vertical in use when said movable member of said shell is disposed in said extended operative position thereof.

7. The enclosure according to claim 4 in which said stationary member of shell has a pair of sidewalls positioned substantially vertically in use and spaced transversely apart, and said movable member of said shell having similarly spaced sidewalls respectively pivotally connected to said sidewalls of said stationary member.

8. The enclosure according to claim 7 in which said sidewalls of said parts are substantially segmental in shape and said pivots for said sidewalls being disposed adjacent the apexes of said segments.

9. The enclosure according to claim 8 in which said movable member of said shall has an arcuate wall extending between and fixed to the sidewalls thereof and connecting the extremities thereof which are opposite said pivots, said stationary member also having a wall portion extending between the sidewalls thereof and said arcuate wall of said movable member having wiping contact with said wall portion of said sationary member of said shell to provide substantially sealed relationship between said members while said movable member is moving between retracted and extended positions.

10. The enclosure according to claim 7 further including power means connected to said sidewalls of said movable member and operable to extend said movable member to said extended operative position thereof, and said door being positioned between the sidewalls of said movable member adjacent the edges thereof which are outermost from said stationary member when said movable member is in the extended operative position thereof.

11. The enclosure according to claim 10 in which said door is substantially vertical when said movable member is in said extended operative position thereof and said door being supported by said movable member so as to open into said shell.

* * * * *